United States Patent [19]

Bezold

[11] 4,124,443
[45] Nov. 7, 1978

[54] NUCLEAR FUEL-ROD ASSEMBLY SUPPORT STRUCTURE

[75] Inventor: Helmut Bezold, Erlangen, Fed. Rep. of Germany

[73] Assignee: Kraftwerk Union Aktiengesellschaft, Mülheim (Ruhr), Fed. Rep. of Germany

[21] Appl. No.: 511,716

[22] Filed: Oct. 3, 1974

[30] Foreign Application Priority Data

Oct. 9, 1973 [DE] Fed. Rep. of Germany ....... 2350700

[51] Int. Cl.² .............................................. G21C 3/30
[52] U.S. Cl. ........................................ 176/78; 176/76
[58] Field of Search ......................................... 176/78

[56] References Cited

U.S. PATENT DOCUMENTS

| 3,212,991 | 10/1965 | Brynsvold et al. | 176/78 |
| 3,267,000 | 8/1966 | Ashcroft et al. | 176/78 |
| 3,674,637 | 7/1972 | Pelafosse et al. | 176/78 |
| 3,736,227 | 5/1973 | Nakazato | 176/78 |
| 3,787,286 | 1/1974 | Anthony | 176/78 |
| 3,791,466 | 2/1974 | Patterson et al. | 176/78 |
| 3,819,477 | 6/1974 | Fromel | 176/78 |

*Primary Examiner*—Samuel W. Engle
*Assistant Examiner*—S. A. Cangialosi

*Attorney, Agent, or Firm*—Kenyon and Kenyon, Reilly, Carr & Chapin

[57] ABSTRACT

A nuclear fuel rod assembly support structure has top and bottom end pieces, and a plurality of fuel rod spacer grids and control-rod guide tubes having top and bottom ends respectively fastened to the top and bottom end pieces to hold these pieces interspaced, the guide tubes being inserted slidably through the openings in the spacer grids and the latter being positioned between the end pieces of the support structure. It is necessary to fix the spacer grids to the guide tubes to maintain the spacer grids at properly interspaced positions and to provide a support structure that is as rigid as possible. For reasons of nuclear physics, the guide tubes and spacer grids are made of different metals or alloys which are difficult to fix together by the use of solidified molten metal using presently known welding and soldering techniques. To overcome this problem, sleeves are used through which the guide tubes are inserted with the spacer grids positioned between these sleeves and with the sleeves axially engaging th spacer grids, the sleeves being fixed to the guide tubes by the solidified molten metal. This overcomes the problem because the sleeves and the guide tubes may be made of the same metals or alloys which can be welded or soldered together easily.

5 Claims, 13 Drawing Figures

NUCLEAR FUEL-ROD ASSEMBLY SUPPORT STRUCTURE

BACKGROUND OF THE INVENTION

Water-cooled reactors, and particularly pressurized-water reactors, have a core made up of groups of fuel rods with each group positioned in a fuel rod and control rod guide tube assembly.

This assembly uses a fuel assembly support structure having the characteristics of a skeleton. It comprises top and bottom end pieces having openings for the control rod guide tubes and fuel rods, a plurality of fuel rod spacer grids having corresponding openings and the control rod guide tubes having top and bottom ends respectively fastened to the top and bottom end pieces and holding these pieces interspaced. The guide tubes are inserted slidably through the openings in the spacer grids and because the spacer grids must be held at interspaced positions between the end pieces, the spacer grids must be fixed to the control rod tubes, this also being necessary to make the fuel assembly support structure as rigid as possible.

Such a support structure may have a length in the order of 4,840 mm and have a cross section of only 230 mm × 230 mm in the case of a square cross section. The control rod guide tubes may have a diameter in the order of only about 12 mm, and since they are used for the control rods which control the reactivity of the reactor core, when the structure is loaded with the fuel rods to form the assembly in the reactor core under service conditions, the fuel assembly support structure rigidity, including the guide tubes, is important.

All of the parts are, of course, made of metals or metal alloys. Therefore, to fix the spacer grids and guide tubes together in a rigid manner, the prior art has used welding and soldering techniques involving the alloying of molten metal with the materials of the two parts to be fixed together.

However, for reasons of nuclear physics, the guide tubes and spacer grids should preferably be made of differing metals or alloys. For example, the guide tubes are desirably made of stainless steel while the spacer grids are desirably made of a zirconium alloy. Such differing materials cannot be joined together reliably by known techniques, such as by soldering or welding, involving the incidental use of solidified molten metal.

Therefore, although undesirable from the viewpoint of nuclear physics, the prior art has involved the use of spacer grids and guide tubes made of the same metal or alloy and joined together by spot welding, in many instances.

SUMMARY OF THE INVENTION

The object of the present invention is to provide mechanical joints or connections between the guide tubes and spacer grids and which are adequate to provide the fuel rod assembly supporting structure with the required structural rigidity, thus permitting the desirable use of differing metals or alloys for making the guide tubes and spacer grids.

To attain this object, the invention uses sleeves through which the guide tubes are inserted with the spacer grids positioned between these sleeves and with the sleeves axially engaging mechanically the spacer grids, these sleeves being themselves fixed to the guide tubes by solidified molten metal as by using soldering or welding techniques. The sleeves are of small mass and they may be made of the same metal or alloy as the guide tube metal or alloy, permitting the use of known and reliable soldering and welding techniques. Because the sleeves mechanically clamp the spacer grids between them without the need for other interconnecting media, the spacer grids may be made of any metal or alloy desirable from the viewpoint of nuclear physics. In other words, the guide tubes and the sleeves may be made of stainless steel with the spacer grids made of zirconium or a zirconium alloy.

The spacer grid openings may be square, octagonal or the like, the control rod guide tubes normally being cylindrical. It is desirable to prevent relative rotation on the part of the guide tubes and spacer grids and to prevent this, the sleeves fixed to the guide tubes can be made to mechanically interlock non-rotatively with the spacer grids.

A more detailed disclosure of this invention is provided by the following.

BRIEF DESCRIPTION OF THE DRAWINGS

In the accompanying drawings the various figures are as follows.

DETAILED DESCRIPTION OF THE INVENTION

Figure 1:
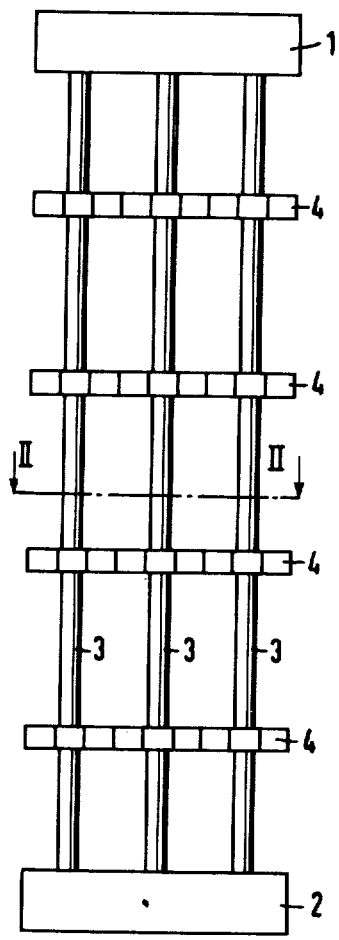
FIG. 1 in elevation and somewhat schematically shows a nuclear fuel rod assembly support structure ready to be loaded with nuclear fuel rods.
Figure 2:
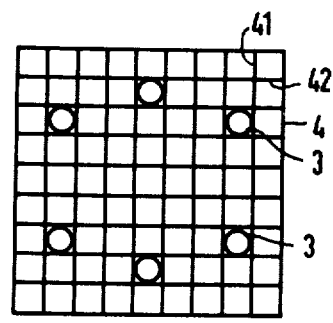
FIG. 2 is a cross section taken on the line II—II in FIG. 1.

Referring first to FIGS. 1 and 2, the components of a typical nuclear fuel-rod assembly support structure is shown, this view being schematic in that in actual practice the structure would be substantially longer as compared to its cross-sectional dimensions, as previously indicated.

As previously described, the structure comprises the top and bottom end pieces 1 and 2, both of which are in the usual way formed with a multiplicity of holes, some of which are for insertion of the fuel rods and some of which are for passage of the control rod guide tubes. It is these control rod guide tubes 3 which have their upper and lower ends rigidly fixed to the top and bottom end pieces. As shown by FIG. 2, the guide tubes 3 are arranged to receive a control rod cluster (not shown), all of the control rods moving simultaneously up and down in the guide tubes 3 as required for control of the core reactivity. The spacer grids 4 are interspaced along the lengths of the guide tubes 3 and must be rigidly fastened to the guide tubes so as to fix the spacer grid positions immovably and to provide bracing for the guide tubes 3 which, as previously indicated, may have a diameter of only about 12 mm while being several meters long.

Figure 3:
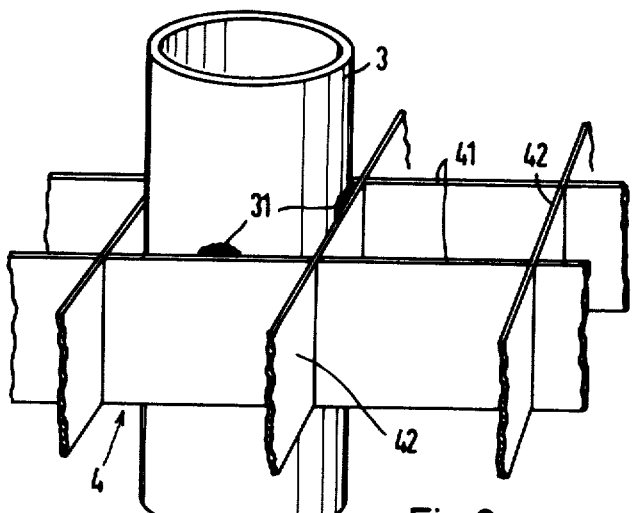
FIG. 3 in perspective shows a control rod fixed to the spacer grid in the prior art manner by using welding.

The spacers 4 are, in this example, shown as being of the egg-crate type formed by intercrossing flat strips as shown by FIG. 3. Sometimes the spacers are machined from solid metal. Also, the spacer grid openings sometimes have other contours than the square openings illustrated.

The prior art manner of connecting or fixing the spacer grids 4 to the guide tubes 3 is illustrated by FIG. 3. This is done by solidified molten metal in the form of the welds shown at 31, which are ordinarily spot-welds. The strips 41 and their right angularly crossing strips 42 are both spot-welded to the guide tube 3. The above prior art practice can be applied successfully and reliably only when the spacer grids and the control rod tubes are made of the same metal or metal alloys.

Figure 4:
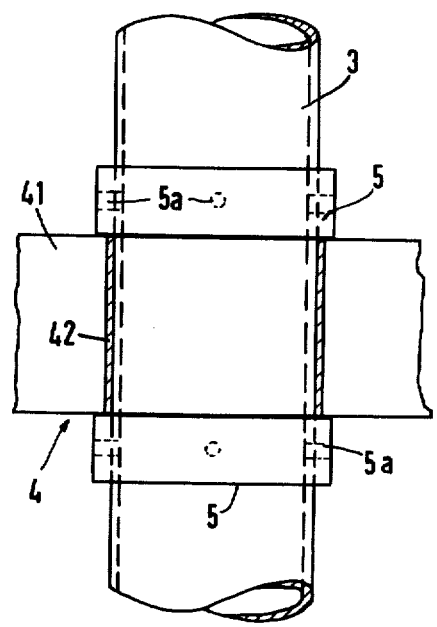
FIG. 4 is a vertical section through one of the spacer grids and providing an example of the present invention.

Contrasting with the above, in the example of the present invention shown by FIG. 4, the guide tube 3 and the spacer grid 4 can be made of differing metals. This is because the interconnection between the two parts is made by the sleeves 5 through which the guide tube 3 is inserted with the spacer grid 4 positioned between these sleeves 5 and with the sleeves 5 in their axial direction engaging the spacer grid. The sleeves 5 and guide tube 3 are interfixed by welding, as indicated by the spot-welds 5a. During the spot-welding, the metal of the sleeves and guide tube are momentarily rendered molten after which with cooling the molten metal solidifes to rigidly fasten the sleeves to the guide tubes.

With this new construction the fixing or connection of the various parts together by the use of solidified molten metal is entirely practical because the sleeves 5 being of small mass may be made of the same metal or alloy as the guide tube 3. Ordinarily welding techniques are entirely practical and there is no sacrifice of the usual reliability to be expected from the use of these techniques. The selection of the metal or alloy can be made entirely from the viewpoint of nuclear physics rather than from the viewpoint of what can be joined together by known welding techniques. In addition, the accessibility of the sleeves from the top and bottom of each spacer grid facilitates the practical use of welding techniques.

Figure 5:
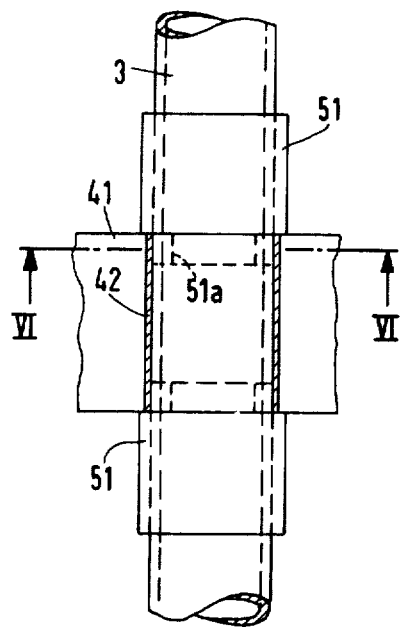
FIG. 5 is like FIG. 5 but shows a modification of the invention.
Figure 6:
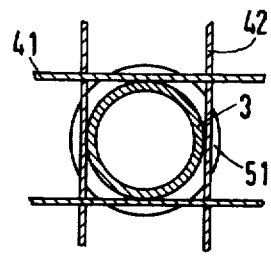
FIG. 6 is a cross section taken on the line VI—VI in FIG. 5.

In FIGS. 5 and 6 the sleeves 51 are shown as having cutouts which engage the spacer grid strips 41 and 42 to prevent relative rotation between the guide tubes to which the sleeves are welded, and the spacer grids.

Figure 8:
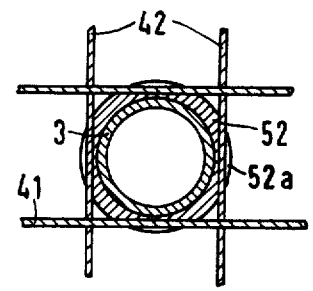
FIG. 8 is a cross section taken on the line VIII—VIII in FIG. 7.
Figure 7:
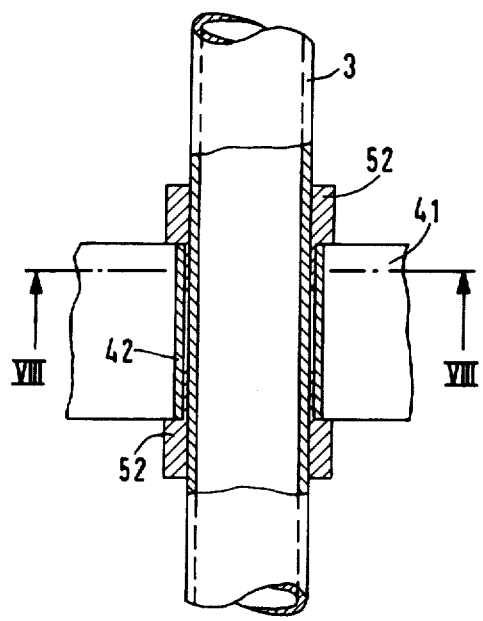
FIG. 7 shows a further modification.

The above cutouts, indicated at 51a, can also be provided in effect by other arrangements. As shown by FIGS. 7 and 8, the sleeves 52 have flats 52a which extend for a portion of their lengths which are next to the spacer grid, these portions extending into the spacer grid openings and flatly engaging the flat criss-cross strips of the spacer grid, to in this way prevent the relative rotation.

Figure 9:
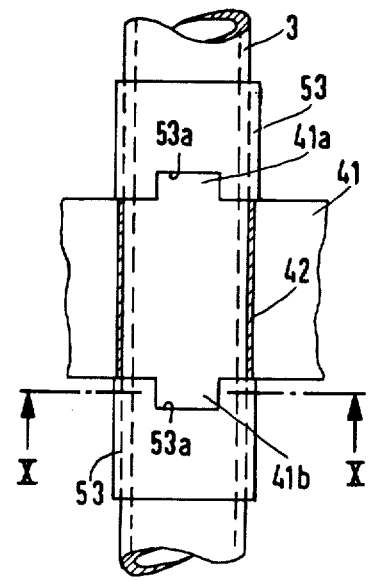
FIG. 9 shows still another modification of the FIG. 4 form.
Figure 10:
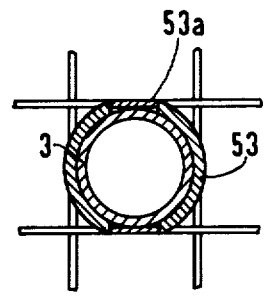
FIG. 10 is a cross section taken on the line X—X in FIG. 9.

FIGS. 9 and 10 show interlock against relative rotation by the spacer grids being formed with tongues 41a and 41b which fit in grooves 53a formed in the sleeves 53, to thereby form tongue and groove joints preventing the guide tubes 3 from rotating relative to the spacer grids.

Figure 11:
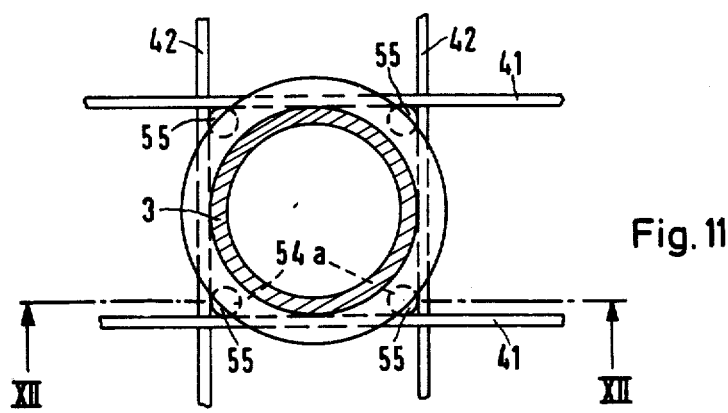
FIG. 11 is a horizontal cross section of another modification of the invention.
Figure 12:
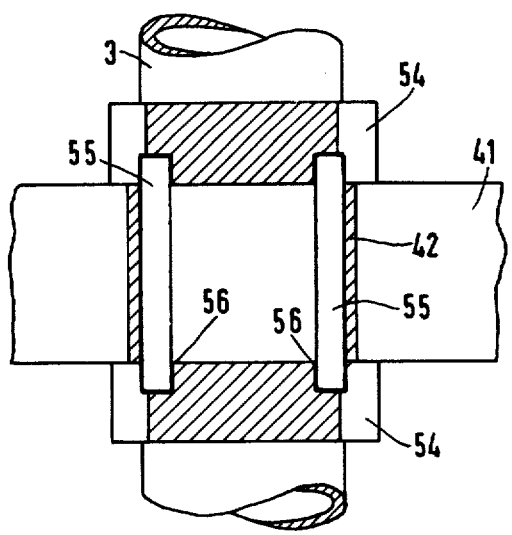
FIG. 12 is a vertical section taken on the line XII—XII in FIG. 11.

Finally, as shown by FIGS. 11 and 12, the sleeves 54 may be formed with axially extending grooves 54a which are in effect blind bores which for a part of their circumference open radially outwardly from the sleeves. The spacer grid openings inherently form corners where the strips 41 and 42 intercross and the grooves or blind bores 54a are positioned to register with these corners, dowel pins 55 being positioned in these blind bores 54a and nesting in the corners of the spacer grids to provide a lock against rotation of the guide tube relative to the spacer grid.

Figure 13:
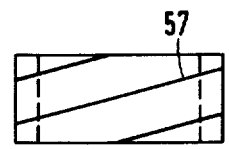
FIG. 13 shows a modified form of the sleeve alone, this view being in elevation.

The sleeves can be made of circumferentially solid metal or in the form of a helical coil 57 as illustrated by FIG. 13.

Although not shown, the sleeves may be longitudinally slotted over part of their lengths so that they can radially expand and contract to accommodate thermally induced movement. This effect is, of course, provided if the sleeve is made as a helical coil as shown by FIG. 13.

What is claimed is:

1. A nuclear fuel rod assembly support structure comprising top and bottom end pieces, a plurality of fuel rod spacer grids having openings therethrough, and control-rod guide tubes having top and bottom ends respectively fastened to said top and bottom end pieces and holding these pieces interspaced, said guide tubes being inserted through said openings in said spacer grids and the spacer grids being positioned between said end pieces, wherein the improvement comprises sleeves through which said guide tubes are inserted with said spacer grids in each instance clamped between two of these sleeves with the sleeves engaging the spacer grid's top and bottom surfaces and fixed to the guide tube by solidified molten metal, said guide tubes and spacer grids being respectively made of different metals which are at least difficult to fix together by solidified molten metal, and said sleeves being made of the same metal as are said guide tubes, said support structure having means for mechanically locking said spacer grids and said sleeves against relative rotation and said means being formed by said spacer grids having walls surrounding said openings and said sleeves having cutouts which engage portions of said walls.

2. A nuclear fuel rod assembly support structure comprising top and bottom end pieces, a plurality of fuel rod spacer grids having openings therethrough, and control-rod guide tubes having top and bottom ends respectively fastened to said top and bottom end pieces and holding these pieces interspaced, said guide tubes being inserted through said openings in said spacer grids and and the spacer grids being positioned between said end pieces; wherein the improvement comprises sleeves through which said guide tubes are inserted with said spacer grids in each instance clamped between two of these sleeves with the sleeves engaging the spacer grid's top and bottom surfaces and fixed to the guide tube by solidified molten metal, said guide tubes and said spacer grids being respectively made of different metals which are at least difficult to fix together by solidified molten metal, and said sleeves being made of the same metal as are said guide tubes, said support structure having means for mechanically locking said spacer grids and said sleeves against relative rotation and in which said means is formed by said sleeves having end portions engaging said spacer grids and which have flat side surfaces, said spacer grids having flat sides defining said openings and engaged by said flat surfaces.

3. A nuclear fuel rod assembly support structure comprising top and bottom end pieces, a plurality of fuel rod spacer grids having openings therethrough, and control-rod guide tubes having top and bottom ends respectively fastened to said top and bottom end pieces and holding these pieces interspaced, said guide tubes being inserted through said openings in said spacer grids and the spacer grids being positioned between said end pieces; wherein the improvement comprises sleeves through which said guide tubes are inserted with said spacer grids in each instance clamped between two of these sleeves with the sleeves engaging the spacer grid's top and bottom surfaces and fixed to the guide tube by solidified molten metal, said guide tubes and said spacer grids being respectively made of different metals which are at least difficult to fix together by solidified molten metal, and said sleeves being made of the same metal as are said guide tubes, said support structure having means for mechanically locking said spacer grids and said sleeves against relative rotation and in which said means is formed by said spacer grids and said sleeves forming tongue-and-groove joints interlocking the spacer grids and sleeves non-rotatively together.

4. A nuclear fuel rod assembly support structure comprising top and bottom end pieces, a plurality of fuel rod spacer grids having openings therethrough, and control-rod guide tubes having top and bottom ends respectively fastened to said top and bottom end pieces and holding these pieces interspaced, said guide tubes being inserted through said openings in said spacer grids and the spacer grids being positioned between said end pieces; wherein the improvement comprises sleeves through which said guide tubes are inserted with said spacer grids in each instance clamped between two of these sleeves with the sleeves engaging the spacer grid's top and bottom surfaces and fixed to the guide tube by solidified molten metal, said guide tubes and said spacer grids being respectively made of different metals which are at least difficult to fix together by solidified molten metal, and said sleeves being made of the same metal as are said guide tubes, said support structure having means for mechanically locking said spacer grids and said sleeves against relative rotation and in which said means is formed by said sleeves having end portions engaging said spacer grids and axially extending recesses formed in said ends, said openings having corners and dowel pins being nested in said corners and positioned in said recesses.

5. A nuclear fuel rod assembly support structure comprising top and bottom end pieces, a plurality of fuel rod spacer grids having openings therethrough, and control-rod guide tubes having top and bottom ends respectively fastened to said top and bottom end pieces and holding these pieces interspaced, said guide tubes being inserted through said openings in said spacer grids and the spacer grids being positioned between said end pieces; wherein the improvement comprises sleeves through which said guide tubes are inserted with said spacer grids in each instance clamped between two of these sleeves with the sleeves engaging the spacer grid's top and bottom surfaces and fixed to the guide tube by solidified molten metal, said guide tubes and said spacer grids being respectively made of different metals which are at least difficult to fix together by solidified molten metal, and said sleeves being made of the same metal as are said guide tubes and in which said sleeves are formed by helical coils.

* * * * *